(12) United States Patent
Pruneri et al.

(10) Patent No.: US 7,088,874 B2
(45) Date of Patent: Aug. 8, 2006

(54) ELECTRO-OPTIC DEVICES, INCLUDING MODULATORS AND SWITCHES

(75) Inventors: Valerio Pruneri, Grosio (IT); Michele Belmonte, Lodi (IT); Massimo Orio, Abbiategrasso (IT)

(73) Assignee: Corning Incorporated, Corning, NY (US)

( * ) Notice: Subject to any disclaimer, the term of this patent is extended or adjusted under 35 U.S.C. 154(b) by 217 days.

(21) Appl. No.: 10/671,165

(22) Filed: Sep. 25, 2003

(65) Prior Publication Data

US 2004/0061918 A1    Apr. 1, 2004

(30) Foreign Application Priority Data

Sep. 26, 2002    (EP) .................................. 02078982

(51) Int. Cl.
*G02F 1/035*    (2006.01)
(52) U.S. Cl. .................................. 385/3; 385/8; 385/40
(58) Field of Classification Search .................... None
See application file for complete search history.

(56) References Cited

U.S. PATENT DOCUMENTS

| | | | | |
|---|---|---|---|---|
| 4,709,978 A | * | 12/1987 | Jackel ........................... | 385/3 |
| 4,797,641 A | | 1/1989 | Djupsjobacka ............. | 332/7.51 |
| 5,005,932 A | | 4/1991 | Schaffner et al. ........ | 350/96.14 |
| 5,278,924 A | | 1/1994 | Schaffner ...................... | 385/3 |

OTHER PUBLICATIONS

"Bandpass Traveling-Wave Mach-zehnder Modulator in LiNbO3 with Domain Reversal" W. Wang, et al, IEEE Photonics Technology Letters, Vo. 9, No. 5, May 1997.*

(Continued)

*Primary Examiner*—Frank G. Font
*Assistant Examiner*—Michael P. Mooney
(74) *Attorney, Agent, or Firm*—Ronald J. Paglierani

(57) ABSTRACT

An electro-optical device capable of modulating the amplitude or phase of an optical output in response to an electrical data or control signal, or of switching it, has reduced frequency-dependence and a better combination of operating voltage and bandwidth. It comprises a body of electro-optically active material, waveguides for passing light through the body, and electrodes for applying an electric field with a frequency in the microwave region to the body, and its transverse geometry is such as to maintain adequate phase velocity matching between optical and microwave frequencies. There is a discontinuity in either the body or at least one of the electrodes such that the direction of the electro-optic effect is reversed for a portion of the length of the device at or near its downstream end.

The result of such a discontinuity (in combination with phase velocity matching) is that the device operates in three successive zones: in the upstream zone, desirable phase change is induced for all frequencies in the bandwidth of the device; in the middle zone, desirable phase change is induced for frequencies in the upper part of the bandwidth, but phase change in the lower frequencies becomes excessive; while in the downstream zone, there is no significant phase change in the higher frequencies but the excess change at lower frequencies is reversed.

9 Claims, 4 Drawing Sheets

OTHER PUBLICATIONS

"First-order quasi-phase matched LINbO$_3$ waveguide periodically poled by applying an external field for efficient blue second-harmonic generation" M. Yamada, et al Applied Physics Letters 62 (5) Feb. 1, 1993 pp. 435-436.

"A Review of Lithium Niobate Modulators for Fiber-Optic Communications Systems" E. L. Wooten, et al IEEE Journal of Selected Topics in Quantum Electronics vol. 6, No. 1, Jan./Feb. 2000 pp. 69-82.

"Modeling and Optimization of Traveling-Wave LiNbO$_3$ Interferometric Modulators" H. Chung, et al IEEE Journal of Quantum Electronics, Vo. 27, No. 3, Mar. 1991 pp. 608-617.

"Wide-bandwidth high-frequency electro-optic modulator based on periodically poled LiNbO$_3$" Y. Lu, et al Applied physics Letters, vol. 78, No. 8 Feb. 19, 2001, pp. 1035-1037.

"Novel Type of Baseband Phase-Reversal Electrode For Optical Modulators with Linear Phase Response" A. Djupsjobacka Electronics Letters, 26 Mar. 1, 1990, No. 5 pp. 318-320.

"Bandpass Traveling-Wave Mach-Zehnder Modulator in LiNbO$_3$ with Domain Reversal" W. Wang, et al IEEE Photonics Technology Letters, Vo. 9, No. 5, May 1997.

* cited by examiner

ELECTRO-OPTIC DEVICES, INCLUDING MODULATORS AND SWITCHES

CROSS-REFERENCE TO RELATED APPLICATIONS

This application claims the benefit of priority under 35 U.S.C. § 119 of European Patent Application Serial No. 02078982.2 filed on 26 Sep. 2002.

BACKGROUND OF THE INVENTION

1. Field of the Invention

This invention relates to electro-optical devices, primarily for use in optical communications, that are capable of modulating the amplitude or phase of an optical output in response to an electrical data or control signal, or of switching it (for example, switching at a high speed, as in the context of a time-division demultiplexer).

2. Technical Background

"External" modulators reliant on the electro-optical effect, typically in lithium niobate, some semiconductors (e.g. GaAs and InP), "poled" polymers or "poled" glasses, are used to modulate light obtained from a laser. In this way, efficient data encoding can be achieved, even at high speeds. In principle, an electric field, typically with a frequency in the microwave region, is applied to the electro-active material and has the effect of changing its refractive index, whereby the speed at which light passes through it is changed and a phase change consequently induced in the light; usually, but not necessarily, this phase change is converted into a change in amplitude by an interferometric technique. A complication to this simple principle arises because a substantial optical path length is needed to achieve sufficient modulation depth, and the phase velocities of optical and microwave signals in electro-active materials are substantially different: for example, in lithium niobate, which is the most frequently used electro-active material, the ratio of the two velocities is around 2:1. The result of this is that "walk-off" would occur between the electric and optical signals within the active zone of the device, that is they would move progressively out of phase if suitable measures were not taken. The direction of modulation would reverse as they moved into antiphase and insufficient or even no resultant modulation would be obtained. Since the higher the microwave frequency, the greater the degree of mismatch, phase velocity mismatch leads to severe bandwidth limitations.

Adequate phase velocity matching can be achieved by appropriate design of the transverse geometry of the modulator, for example by the use of thick electrodes and/or of buffer layers to provide for partial propagation of the microwave mode in a medium of low dielectric constant.

Other techniques that are used to obtain phase matching are first the use of electrodes designed to delay the electrical signal in the waveguide by half a wavelength at the places where phase reversal would otherwise occur, and second the use of a body of electro-optical material that is periodically "poled" such that the direction of its electro-optic effect is reversed at those points. These techniques are primarily suitable for modulators for high-frequency narrow-band operation; they can be extended to low-frequency pass-band or large-bandwidth applications, for example by using structures with multiple periodicities or aperiodic structures, but always at the expense of significantly reduced modulation efficiency.

Another complicating factor is that microwave losses within the device are substantial and frequency-dependent (losses vary approximately in proportion to the square root of the frequency), and the combined result of these effects is that an increase in the length of the active region, which is desirable to reduce the voltage needed to obtain a phase difference of half a wavelength (or $\pi$) between the "on" and "off" conditions (sometimes hereinafter called the "switching voltage"), results in a substantial loss of bandwidth through the degradation of high-frequency signals.

SUMMARY OF THE INVENTION

The inventors have recognized that the downstream end of such devices is largely ineffective at high frequencies, because the microwave losses in the device have already severely attenuated the electrical signal, and the invention exploits this realization to provide an active device in which the overall electro-optical response is less sensitive to frequency, and in which a better combination of switching voltage and bandwidth can be obtained.

In accordance with the invention, an electro-optical device capable of modulating the amplitude or phase of an optical output in response to an electrical data or control signal, or of switching it, comprising a body of electro-optically active material, waveguides for passing light through the body, and electrodes for applying an electric field with a frequency in the microwave region to the body, the transverse geometry of the device being such as to maintain adequate phase velocity matching between optical and microwave frequencies, is characterized by a discontinuity in either the body or at least one of the electrodes such that the direction of the electro-optic effect is reversed for a portion of the length of the device at or near its downstream end.

The result of such a discontinuity (in combination with phase velocity matching) is that the device operates in three successive zones along the modulator length: in the upstream zone, desirable phase change is induced for all frequencies in the bandwidth of the device; in the middle zone, desirable phase change is induced for frequencies in the upper part of the bandwidth, but phase change in the lower frequencies becomes excessive; while in the downstream zone, there is no significant phase change in the higher frequencies but the excess change at lower frequencies is reversed.

In the ideal case in which phase-velocity matching is exact throughout the device, the optimum distance from the upstream end of the device to the discontinuity, a, can be determined by solving the equation $$\tfrac{1}{2}\sqrt{2}(2a-L) = (1/d)(1 - 2e^{-da} + e^{-dL})$$

where L is the total optical length of the device in m (assumed to be large enough for microwave losses to be substantial—the invention is not applicable if losses are negligible); and d is the microwave loss at the upper limit of the intended microwave bandwidth of the device (at which the optical output is 3 dB below its maximum), expressed in m−1.

In practice, the phase-velocity matching may be imperfect and some optimization of a by experimentation may be desirable.

In a first form of the invention, the electro-optic material is uniform apart from a single discontinuity as described at which its crystal structure or poling is reversed, and phase velocity matching is achieved by using a conventional electrode design, as in a uniform body of the electro-optic material.

In a second form of the invention, the electro-optic material is entirely uniform and the discontinuity is imposed solely by a discontinuity in the design of the electrodes.

The first form is thought to have the following advantages, and is at the present time preferred:
- the sign of the electro-optical effect changes more rapidly across the discontinuity region and there is no effect due to fringe field as may be associated with discontinuity of electrodes;
- since the electrode structure is uniform along the modulator length, a risk of loss or reflection for the microwave is avoided (an effect that is greatest at higher frequencies); and
- simpler electrode geometry makes it easier to calculate losses accurately and so facilitates design.

The first form of the invention is applicable to any electro-optically active material capable of supporting the required discontinuity but the second form may be limited to particular materials for which appropriate discontinuous electrode structures can be devised; for example, the discontinuous electrode structure to be described below is appropriate for use with z-cut lithium niobate, and can also be applied to other materials, e.g. semiconductors, poled polymers and poled glasses, but not to x-cut lithium niobate.

The second form of the invention, with an appropriate discontinuous electrode structure, is preferred for materials where poling (i.e. electro-optic coefficient reversal) is difficult or where it is not compatible with other fabrication processes, e.g. waveguide or electrode fabrication.

More complex forms of the invention, in particular forms in which simultaneous discontinuities are provided in both the electrode and the electro-optic material, are possible; but it is not at present thought that they have any advantage sufficient to justify their complexity.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

The invention will be further described, by way of example, with reference to the accompanying drawings in which.

DETAILED DESCRIPTION OF THE INVENTION

Figure 1:
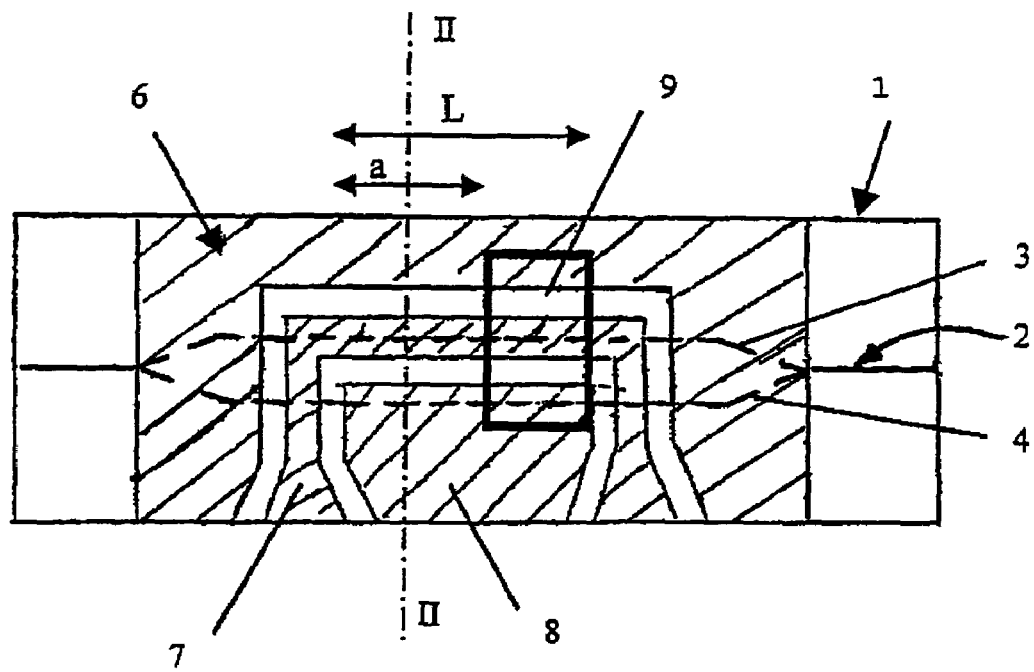
FIGS. 1 and 2 show the top view and the cross-section, respectively, of a first z-cut LiNbO$_3$ Mach-Zehnder modulator in accordance with the first form of the invention.
Figure 2:
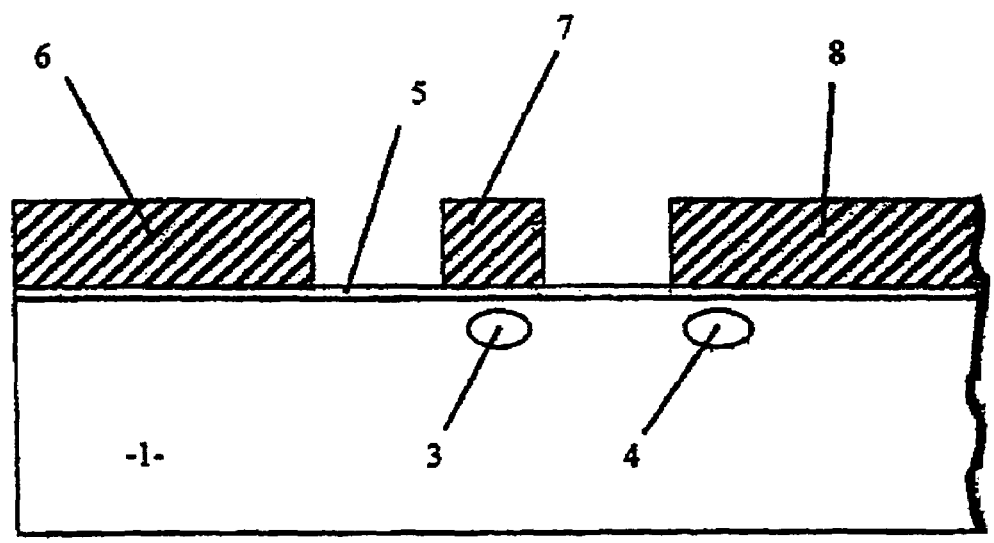

In the structure of FIGS. 1 and 2, a lithium niobate chip 1 is formed in the usual way with a Mach Zehnder interferometer 2 having two branches 3 and 4. A buffer layer 5 (e.g. of silica) is used to achieve phase-velocity matching and to reduce the optical loss due to metal electrodes 6, 7, 8. The thickness of the silica layer is in the range of 0.5–1.5 μm, the thickness of the metal (preferably gold) electrodes is in the range 15–25 μm. Electrode 7 is a 'hot' electrode with a width in the range 5–15 μm; 6 and 8 are 'ground' electrodes with widths in the range 10–1000 μm and each of the gaps between 'hot' and 'ground' electrodes is in the range 10–20 μm.

The active modulating zone of the device is the length L, and at a distance a from its upstream end, calculated by solving the equation above, domain inversion is realized. In this way the modulator is made up of two regions, the domain orientation of zone 9 being opposite that of the remainder.

A number of procedures for obtaining domain inversion are known; our preference is to use the application to the zone to be inverted of an electric field in excess of the coercive field of the material—about 21 kV/mm for lithium niobate—for which details can be found in a paper by Yamada et al, Applied Physics Letters vol 62 page 435 (1993); alternatives include
- diffusion of ions at a temperature close to the Curie point of the material;
- proton exchange followed by exposure to temperature just below the Curie point of the material and
- electron-beam treatment:

details of each of these are readily available in the literature. The shorter electrode defines the effective length of the modulator, and it is sufficient to invert as far as its downstream end (and laterally to include both waveguides; but a larger area could be inverted if found more convenient. Inversion will normally need to be carried out before the buffer layer and electrodes are applied, but it is preferable to do so after the waveguides have been formed.

Figure 3:
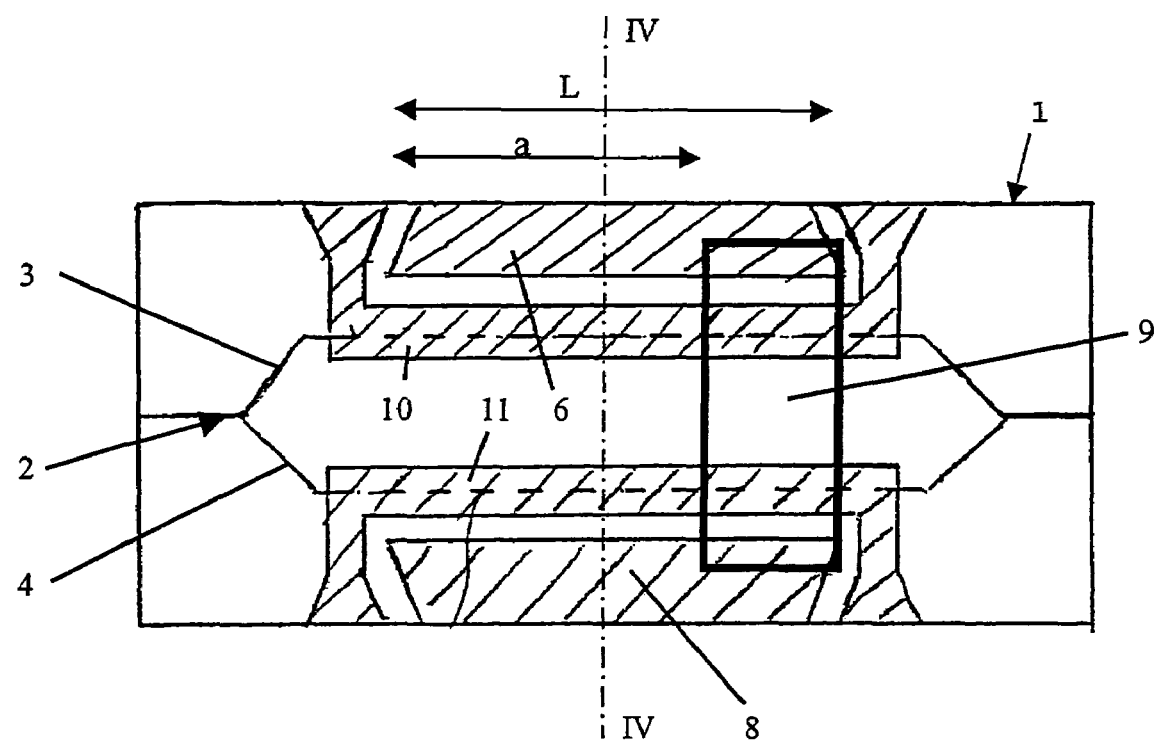
FIGS. 3 and 4 show the top view and the cross-section, respectively, of a second z-cut LiNbO$_3$ Mach-Zehnder modulator also in accordance with first form of the invention.
Figure 4:
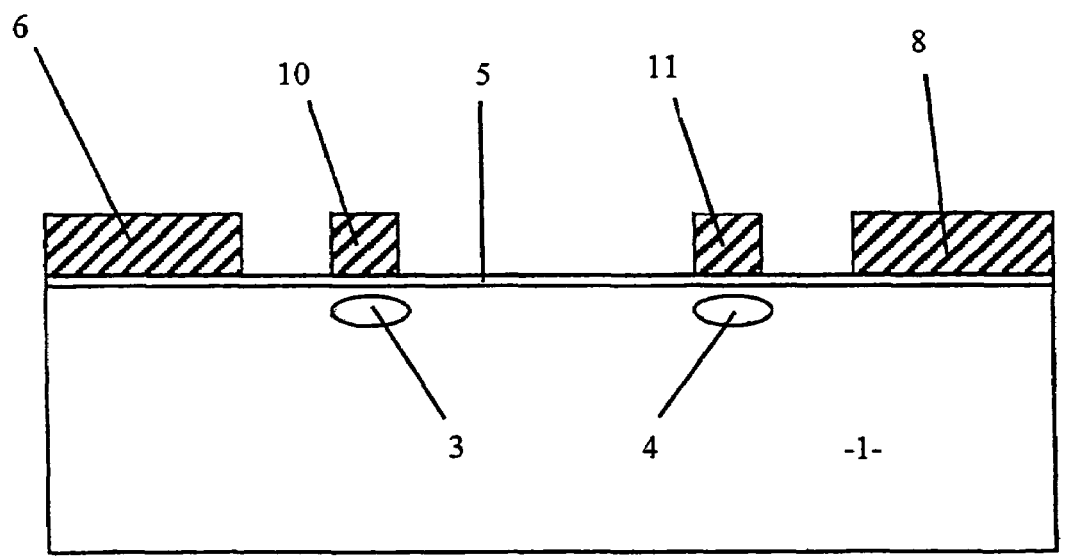

The modified design shown in FIGS. 3 and 4 is substantially the same, except that there are two 'hot' electrodes 10 and 11, driven by opposite sign voltages, located over respective interferometer branches 3 and 4 and spaced sufficiently apart from each other to avoid microwave coupling (a distance in the range of 100–200 μm will usually be sufficient).

Figure 5:
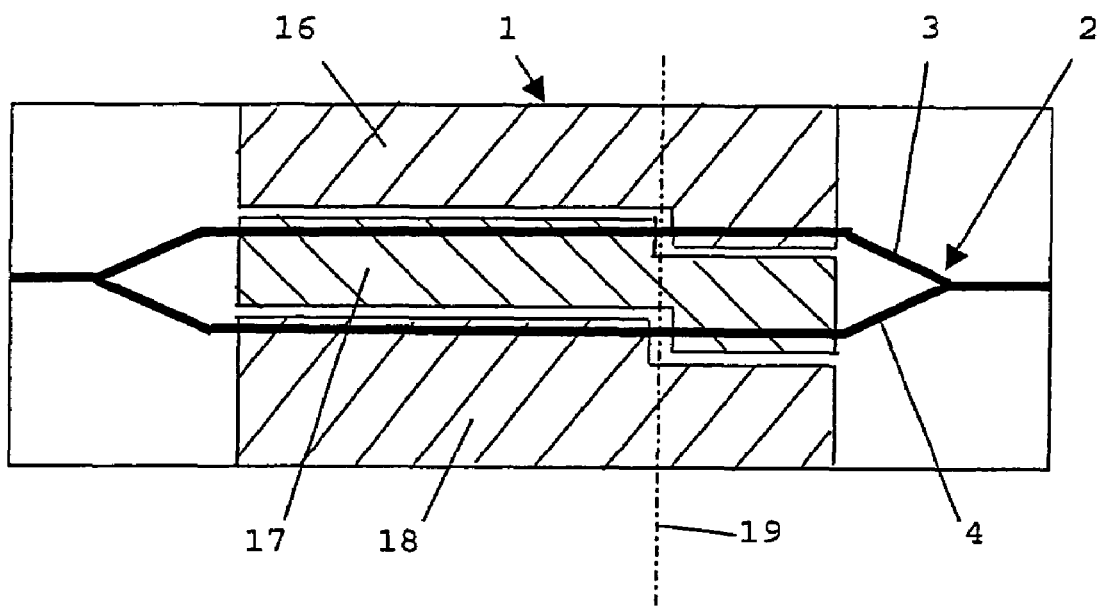
FIG. 5 is a top view of a third z-cut LiNbO$_3$ Mach-Zehnder modulator in accordance with the second form of the invention.

FIG. 5 shows a third preferred embodiment which differs from structure of FIGS. 1 and 2 primarily in the fact that, adopting the second form of the invention, a uniformly poled (single-domain) z-cut lithium niobate structure is used together with stepped electrodes 16, 17, 18 (corresponding to 6, 7 and 8 respectively in FIG. 1), so that sign reversal of the electro-optic effect is obtained through sign reversal of the microwave field in the waveguides by reversal of their relationship to the "hot" electrode 17 and the ground electrodes 16 and 18. It should be noted that the effect is independent of the microwave frequency.

An example of modulator according to FIGS. 1 and 2 is based on a z-cut lithium niobate chip diffused with titanium to form a Mach Zehnder interferometer with waveguides about 5 µm thick and 7 µm wide comprising parallel straight limbs 26 µm apart and about 70 mm long linked at each end by inclined sections about 2.5 mm long to entry and exit sections each comprising a Y formation and a short straight waveguide. The active region (defined by the length of the shortest electrode 8) is about 60 mm long of which an area (9) about 14 mm long has its domain structure inverted with respect to the remainder by application of an electric field as described already.

The face of the chip is next coated with 1 µm of amorphous silica by sputtering (or electron-beam evaporation could be used). A flash layer comprising titanium and gold is applied over the silica coating by Physical Vapor Deposition technique and a further coating of gold, some tens of µm thick, is grown by electroplating and patterned by lithography to form the electrode structure shown in FIG. 1. The "hot" electrode 7, directly overlying one branch of the interferometer, is about 8 µm wide and each of the gaps between it and the respective ground electrodes 6, 8 are about 18 µm wide.

Figure 6:
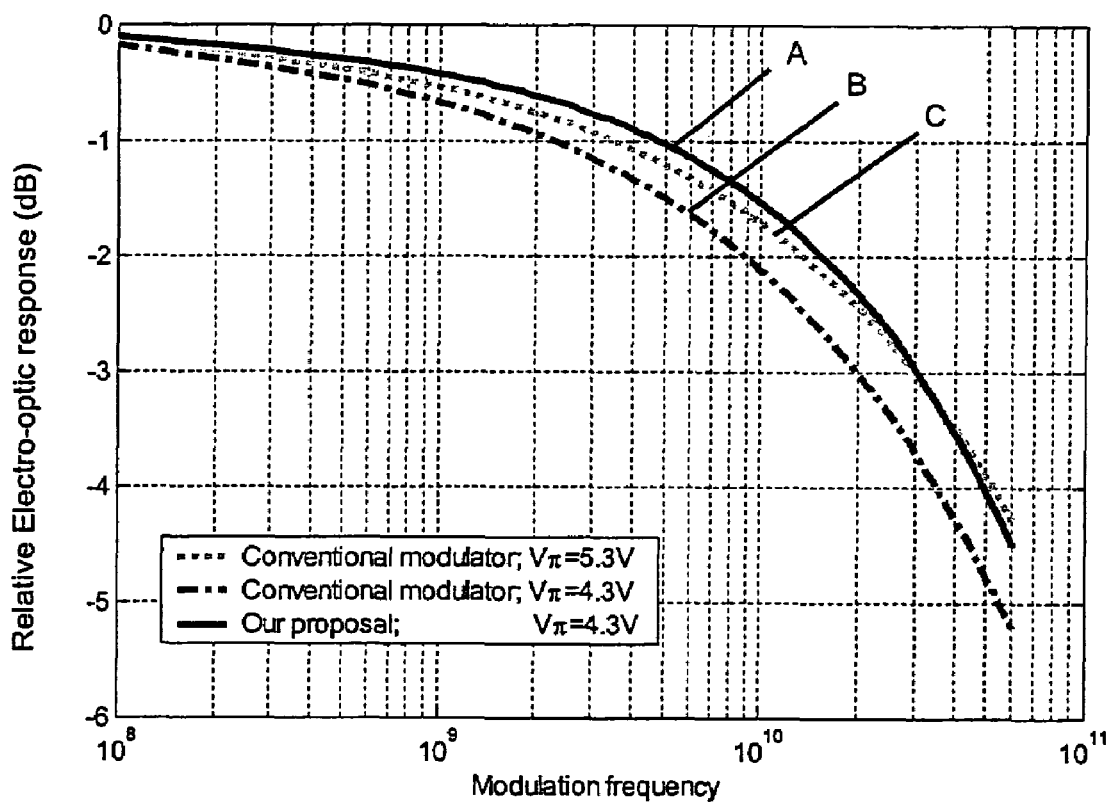
FIGS. 6 and 7 are graphs comparing the characteristics of one modulator in accordance with the invention with a generally similar conventional modulator.
Figure 7:
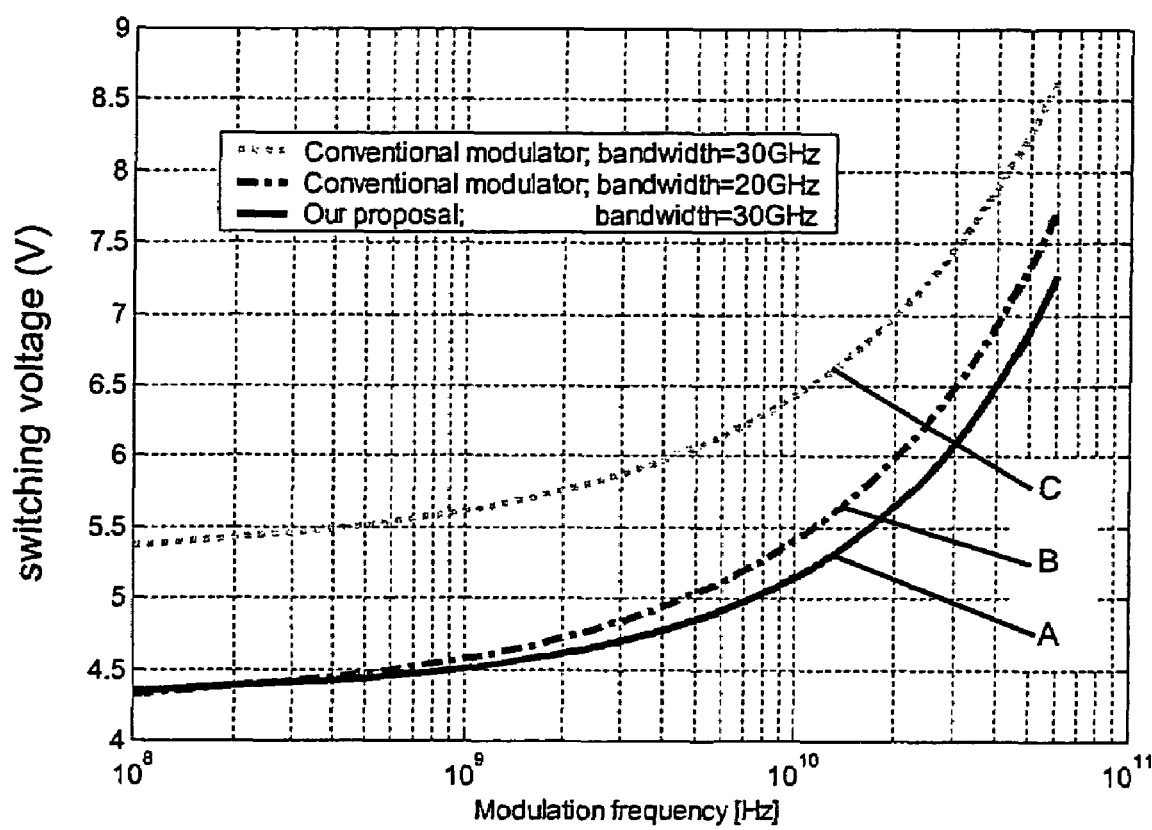

The electro-optic response of this modulator and its switching voltage, calculated as a function of microwave frequency, are shown as the solid curves A in FIGS. 6 and 7 respectively. For comparison, the graphs also show results for two conventional modulators made with the same materials and cross-sectional dimensions (but with lithium niobate of uniform domain structure) whose lengths were chosen to obtain respectively the same switching voltage at the lower end of the bandwidth (curves B) and the same electro-optic response at the upper limit of the bandwidth, that is the frequency at which the response is 3 dB below its maximum (curves C). It will be apparent from the graphs that the modulator in accordance with the invention exhibits a usefully increased bandwidth for a constant switching voltage or a usefully reduced switching voltage for a constant bandwidth, or more generally a better combination of the two characteristics than is achieved by conventional modulators.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. An electro-optical device capable of effecting an alteration in an optical output in response to an electrical signal selected from modulating its amplitude, modulating its phase and switching it, comprising a body of electro-optically active material, waveguides for passing light through the body, and electrodes for applying an electric field with a frequency in the microwave region to the body, the body of electro-optically active material having in succession an upstream zone, a middle zone, and a downstream zone being such as to maintain adequate phase velocity matching between optical and microwave frequencies, the device having a discontinuity within the downstream zone such that the direction of the electro-optic effect is reversed for a portion of the length of the device.

2. A device as claimed in claim 1 in which the electro-optic material is uniform apart from a single discontinuity at which its crystal domain structure is inverted.

3. A device as claimed in claim 1 in which the electro-optic material is uniform apart from a single such discontinuity at which its poling is inverted.

4. A device as claimed in claim 1 in which the electro-optic material is entirely uniform and the discontinuity is imposed solely by a discontinuity in the design of the electrodes.

5. A device as claimed claim 1 in which the electro-optically active material is selected from the group consisting of x-cut and z-cut lithium niobate, semiconductors, poled polymers and poled glass.

6. A device as claimed claim 2 in which the electro-optically active material is selected from the group consisting of x-cut and z-cut lithium niobate, semiconductors, poled polymers and poled glass.

7. A device as claimed claim 3 in which the electro-opticaily active material is selected from the group consisting of x-cut and z-cut lithium niobate, semiconductors, poled polymers and poled glass.

8. A device in accordance with claim 1, being a modulator.

9. A device in accordance with claim 1, being an optical switch.

* * * * *